United States Patent [19]

Rivers

[11] 3,765,225

[45] Oct. 16, 1973

[54] CARBON FILTER LEAK DETECTOR
[75] Inventor: Richard D. Rivers, Louisville, Ky.
[73] Assignee: American Air Filter Company, Inc., Louisville, Ky.
[22] Filed: Oct. 30, 1972
[21] Appl. No.: 302,066

[52] U.S. Cl. ............................................. 73/40.7
[51] Int. Cl. .......................................... G01m 3/20
[58] Field of Search ...................... 73/40.7, 38, 40; 55/97

[56] References Cited
UNITED STATES PATENTS
3,395,514   8/1968   Bub.................................... 73/40.7

Primary Examiner—Donald O. Woodiel
Attorney—Robert W. Fletcher et al.

[57] ABSTRACT

The invention provides a method for testing a carbon type unit filter for leaks, wherein the material used to test the filter is reactive with the carbon filter media. This method of testing unit filters for leaks has the advantages of allowing precise location of any leakage paths, and avoiding loading of the filter during the testing operation.

2 Claims, 2 Drawing Figures

PATENTED OCT 16 1973  3,765,225

CARBON FILTER LEAK DETECTOR

BACKGROUND OF THE INVENTION

The testing of carbon unit filters for leaks has been an ever-continuing task for filter manufacturers. Previously, such testing has been done in a variety of ways which included the introduction of physically adsorbed gases, such as methyliodide or halocarbon refrigerants into the filter. In order to detect the presence of these introduced contaminant gases downstream of the carbon filter, and to measure the fraction of the introduced contaminant gases which penetrate leak paths through the carbon filter, it has been customary to use gas chromatographs. These instruments are bulky, relatively unstable, and require a high degree of skill for operation. The introduction of physically adsorbed gases has the disadvantage of loading the filter media and shortening its life. In addition, the adsorbed contaminant is likely to be desorbed subsequently, thus confusing the data obtained in later tests, and possibly producing toxic or other undesirable effects downstream of the filter. The invention of this disclosure provides a new and novel means of testing carbon filters for leaks.

SUMMARY OF THE INVENTION

The invention provides a method of testing carbon type unit filters for leaks, without loading the filter itself, by introducing a carbon reactive material upstream of the carbon unit filter which, when passed into the filter, contacts and reacts with the carbon to form a gas for example, carbon dioxide, which passes through the filter, while the carbon reactive material which does not come into contact with the carbon filter media, but rather follows a leakage path, does not so react but passes therethrough and is easily detectable downstream of the filter. More specifically, the present invention provides a method of testing carbon type unit filters for leaks comprising introducing a carbon reactive material on the upstream side of the filter; passing the carbon reactive material through the carbon filter, whereupon the material reacts with the carbon contained therein to form a substantially nontoxic nonreactive product with only the carbon reactive material, which passes through leaks, passing unchanged therethrough; and detecting the unchanged portion of the carbon reactive material on the downstream side of the filter.

DESCRIPTION OF THE PREFERRED EMBODIMENT

Figure 1:
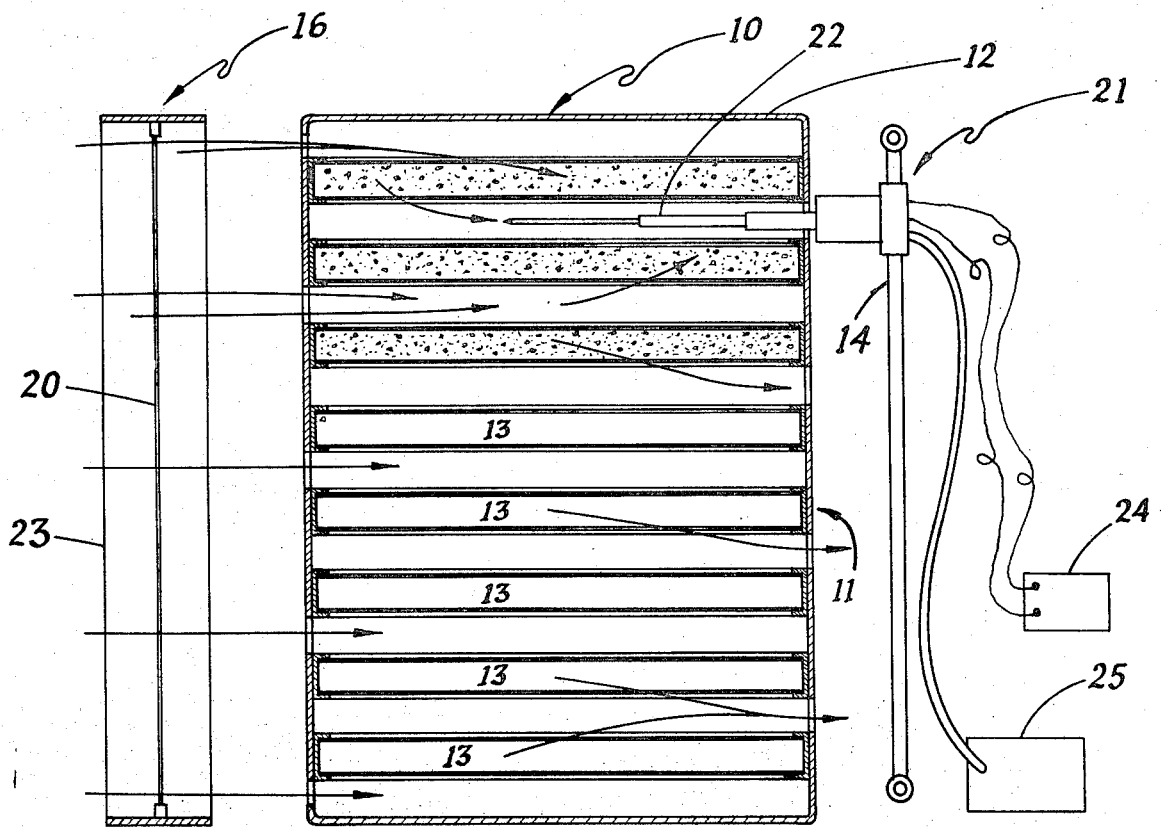
FIG. 1 is a cross-sectional view of the apparatus of this invention as it is employed to test a carbon unit filter.
Figure 2:
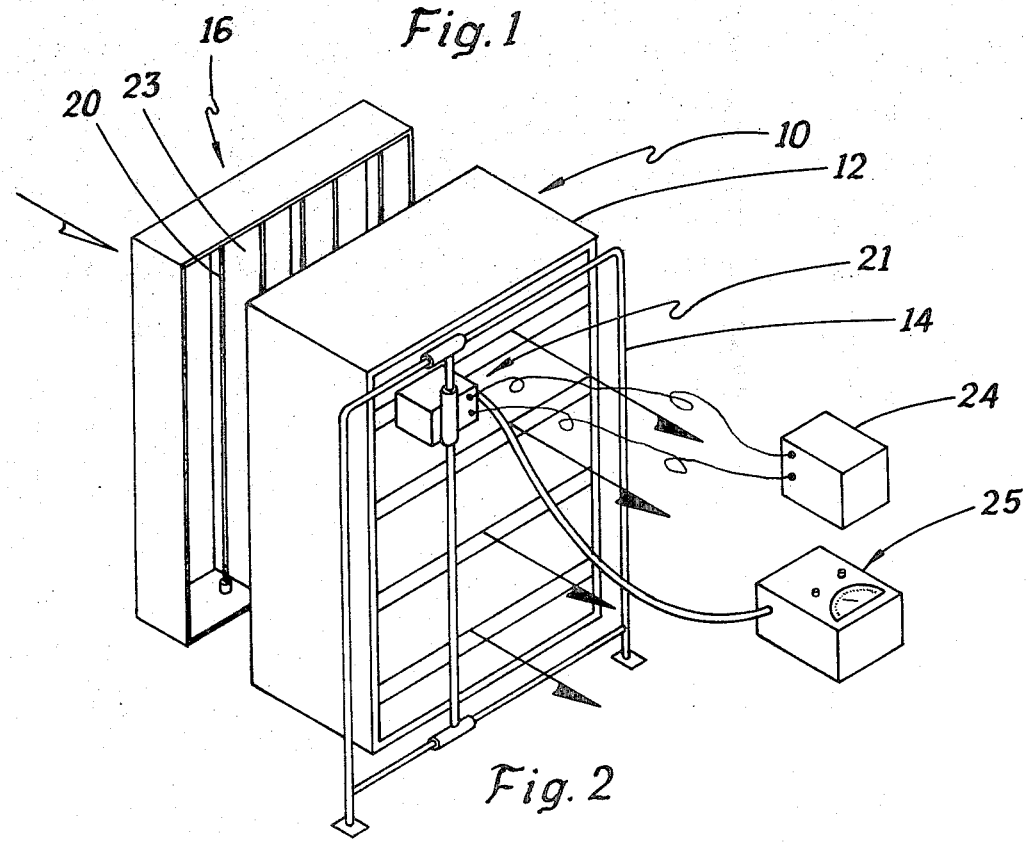
FIG. 2 is an isometric view of the apparatus of FIG. 1.

Filter 10 is a carbon unit filter having a filter tray assembly 11 positioned within housing 12 in flow-through relationship therewith, as is well known in the art. Trays 13 are filled with activated carbon material through which the incoming contaminated gas must pass. To insure a high level of contaminant removal the unit filter is tested for leaks after final assembly in accordance with the present invention as follows: Carbonreactive material is introduced through an introducing means which is advantageously positioned immediately upstream from filter 10. The carbon reactive material introducing means may take any suitable shape or form as long as it accomplishes the objective of delivering the carbon reactive material either uniformly or selectively over the filter assembly as desired. Advantageously, ozone from ozone source 16 is the carbon reactive material and, as shown in the figures, the carbon reactive material introducing means is ozone source 16. Ozone source 16 is comprised of charged electrodes 20 and 23 which because of their charge convert oxygen in the air to ozone as it passes therebetween. Ozone source 16 is of the type which emits the ozone uniformly over the surface of the filter assembly 11. Ozone detecting means 21 is located downstream of filter assembly 11 and is employed to detect any ozone which may be passing through leaks in the filter. This detecting means can assume any suitable shape or structure as long as it accomplishes the objective of detecting ozone in the filtered air. Preferably, an ozone detector is employed which includes wand means 22 supported by frame 14 which can be automatically adjusted by control 24 to pinpoint specific leaks. In the operation of the embodiment of the invention shown in the figures, ozone from ozone source 16 is introduced uniformly over the upstream face of carbon unit filter 10 and allowed to pass therethrough either in combination with a diluting gas or in its as-generated concentration. Wand 22, which advantageously is a telescoping wand, of ozone detecting means 21, is then positioned in close proximity to the downstream face of carbon unit filter 10 to detect any ozone which may be passing through a leakage path in the carbon unit filter. One particularly advantageous feature of the present invention is that ozone, being reactive with carbon, will react upon contact to form carbon dioxide which passes through the carbon filter and does not interfere with the detection of ozone by ozone detecting means 21. Ozone which does not contact the carbon filter but passes through a leakage path without reacting with the carbon filter is thus easily detectable downstream from the filter. The reaction between ozone and activated carbon is rapid and without side reactions and the amount of carbon used in the reaction is so small as to be negligible with respect to the remaining capacity of the carbon filter. Of course, if extensive testing is to be done, one preselectively provides an over supply of carbon material in the filter trays to compensate for such extensive testing. Also the reaction product $CO_2$ is ideal since it is not itself a contaminant and does not interfere with the detection of the test material, ozone. Advantageously, a chemiluminescent detection means 25 can be used to detect the ozone on the downstream side of the filter. Suitable chemiluminescent detectors are well known in the art. One such suitable detector is the Friez Ozone Analyzer, manufactured by Environmental Science Division of Bendix Corporation of 1400 Taylor Avenue, Baltimore, Maryland. Additionally, the present invention is advantageous in that it can be used in clean rooms and like installations, wherein testing must be done at the installation site and contamination of the installation is to be avoided.

Having thus described the invention, what is claimed is:

1. A method of testing carbon type unit filters for leaks comprising:

introducing a carbon reactive material on the upstream side of said filter;

passing said carbon reactive material through said carbon filter, whereupon said material reacts with the carbon contained therein to form a substantially nontoxic nonreactive product with only the carbon reactive material, which passes through leaks, passing unchanged therethrough;

detecting the unchanged carbon reactive material on the downstream side of said filter.

2. The method of claim 1 wherein said carbon reactive material is ozone and said nontoxic nonreactive product is carbon dioxide.

* * * * *